(12) United States Patent
Blondelet et al.

(10) Patent No.: US 6,435,491 B1
(45) Date of Patent: Aug. 20, 2002

(54) FLEXIBLE JOINT FOR A VEHICLE SUSPENSION DEVICE AND PROCESS FOR STABILIZING THE MECHANICAL OPERATING CHARACTERISTICS OF A FLEXIBLE JOINT FOR A VEHICLE SUSPENSION DEVICE

(75) Inventors: Michel Blondelet, Le-Crest; Jean Coue, Romagnat; Patrick Pennequin, Ennezat; Marie-Héleǹe Vantal, Clermont-Ferrand, all of (FR)

(73) Assignee: Compagnie Generale des Etablissements Michelin-Michelin & Cie, Clermont (FR)

( * ) Notice: Subject to any disclaimer, the term of this patent is extended or adjusted under 35 U.S.C. 154(b) by 0 days.

(21) Appl. No.: 09/677,219

(22) Filed: Oct. 2, 2000

(30) Foreign Application Priority Data

Oct. 4, 1999 (FR) ............................................. 99 12417

(51) Int. Cl.[7] .......................... B60G 11/24; B60G 3/14; B60G 3/99; F16F 1/38; F16F 15/08
(52) U.S. Cl. ............ 267/279; 280/124.13; 280/124.177
(58) Field of Search ..................... 280/124.13, 124.177, 280/124.128, 124.1; 267/279, 141, 153, 292, 140; 188/378; 301/127; 403/225–228

(56) References Cited

U.S. PATENT DOCUMENTS

| 2,249,510 A | 7/1941 | Welker |
| 2,270,572 A | 1/1942 | Woolson et al. |
| 4,714,220 A | 12/1987 | Hillstrom et al. |
| 4,732,407 A | 3/1988 | Oyama et al. |
| 4,778,199 A | 10/1988 | Haggerty et al. |
| 4,863,148 A | 9/1989 | Hufnagel |
| 6,145,858 A | 11/2000 | Foulquier |

FOREIGN PATENT DOCUMENTS

| DE | 688421 | | 2/1940 |
| DE | 976856 | | 6/1964 |
| DE | 1630901 | | 2/1971 |
| EP | 1090783 | * | 4/2001 |
| GB | 554695 | | 7/1943 |
| JP | 09132174 | | 5/1997 |

OTHER PUBLICATIONS

Patent Abstracts Of Japan, Publication Date: Oct. 24, 1990, Publication No. JP 02261934, Tokai Rubber Ind Ltd., "Manufacture of Contracted Bushing" (Abstract only).

* cited by examiner

Primary Examiner—Douglas C. Butler
(74) Attorney, Agent, or Firm—Baker Botts L.L.P.

(57) ABSTRACT

A process for stabilizing the mechanical operating characteristics of an elastomeric flexible joint which acts as a spring in a vehicle suspension device by subjecting the joint, before it is put into service, to a deformation corresponding substantially to the maximum deformation intended in service.

19 Claims, 3 Drawing Sheets

FLEXIBLE JOINT FOR A VEHICLE SUSPENSION DEVICE AND PROCESS FOR STABILIZING THE MECHANICAL OPERATING CHARACTERISTICS OF A FLEXIBLE JOINT FOR A VEHICLE SUSPENSION DEVICE

BACKGROUND OF INVENTION

The invention relates to vehicle suspension devices. More particularly, the invention relates to vehicle suspension devices in which the main element having the "suspension spring" function is an elastomeric flexible joint. Patent Application WO 97/47486 describes an axle of this type.

One of the advantages of using elastomeric flexible joints which act as suspension springs at the level of the joint bearings of vehicle suspension devices is to permit greater integration of the spring, shock absorber and vibration- or shock-filtering functions. According to the specifications which have to be met for the different vehicles, an axle of this type may make it possible to reduce the total number of parts used, in particular because separate filtering blocks, such as are currently used for linking the axles or the suspension arms to the body of the vehicle, are not used.

In the suspension joints, elastomeric blocks are now universally used and have supplanted the use of roller bearings or plain bearings because they are capable of imparting the required degree of freedom while ensuring good filtering which is beneficial to comfort, in particular from an acoustic point of view. Furthermore, it is possible to impart to these joints and filtering blocks relatively elaborate guiding functions by controlling their deformations under operating stresses. This is done in order to produce, for example, self-steering axles, that is to say, axles which slightly turn the plane of the wheels merely under the action of the load transfers. Another example of the possibilities provided by these elastomeric joints is to make it possible to integrate, in addition to the degree of freedom necessary for the main function of suspension, a degree of horizontal freedom which substantially improves the comfort of the vehicle.

In the case of the elastomeric joints as used to link the suspension arms (lower wishbone, trailing arms, etc.) to the body, their contribution to taking up the load is negligible (of the order of one percent). In fact, their contribution to taking up the load, which is low and inherent (since the elastomer is bound to the metal parts which surround it), does not enter into the dimensioning at all.

If it is desired to impart to such joints a real contribution to taking up the load, by therefore making them into a true suspension spring under torsional stress, a change in the trim height of the vehicle is noted over time. It is known that creep of the elastomer is one cause of this. However, it is also known that the main part of the creep takes place very quickly, that is to say, in a few days, so that it is sufficient to make allowance for this when mounting the spring so that the vehicle trim height after a few days is the height intended when the vehicle was designed. This, in practice, consists of selecting the mounting azimuth while taking into account both the rated load of the vehicle and the creep.

Unfortunately, there are still variations in vehicle trim height which cannot be explained by these phenomena. These variations appear to be erratic. Shifts in vehicle trim height which may be of as much as several centimeters have been noted. This problem is a great nuisance in particular for final adjustment operations for the geometric parameters which depend on the vehicle trim height or trim (that is to say, the angular position of the body relative to the horizontal ground) of the vehicle. This may be the case, for example, for the orientation of the beam of the headlights or of the brake power distributor.

It has been discovered that the hysteresis of the elastomer is one of the causes of these variations. The hysteresis, which is a phenomenon which is well-known per se, means that the apparent stiffness of the material is different during the increase in the stress and during the reduction in this stress. The characteristic "outward" and "return" stress/strain curves are not superposed as, for example, for a conventional metal spring. It has been discovered that, as long as the elastomeric spring has not been stressed as far as the bump stop, the vehicle trim height (under equal load) is not stabilized. It would appear that the extent of this phenomenon is due to the fact that the starting part of the operation of the spring, that is to say, the state which is free of any stress, is very far from the zone of the stress/strain graph which is covered by the elastomeric spring during operation on a vehicle. Said zone of the graph is displaced substantially each time the spring reaches a "new" maximum deformation, greater than the maximum deformations previously achieved. In fact, it is noted that the mechanical characteristics of the elastomeric spring become substantially constant over time only once the spring has reached (at least once) its state of maximum deformation. It is this observation which forms the basis of the principle of the invention, according to which the joint bearing a load, in order to stabilize its point of operation, must undergo deformation comparable to the maximum deformation provided for during operation.

SUMMARY OF THE INVENTION

The invention therefore relates to a process for stabilizing the mechanical operating characteristics of an elastomeric flexible joint, said joint being intended to act as a spring in a suspension device for a vehicle, said vehicle having a body and wheels, said flexible joint being intended to take up a given rated load, said suspension permitting movement as far as a maximum compression limit, said process consisting, before the putting into normal service of the vehicle, of subjecting said joint to a deformation R comparable to a maximum deformation M corresponding to the deformation undergone by said joint when said suspension reaches said maximum compression limit.

Preferably, this process is characterized in that said deformation R is greater than or equal to said maximum deformation M.

Preferably, this process is furthermore characterized in that said flexible joint is subjected to said deformation R, then said deformation R is relaxed until a deformation S is achieved which corresponds substantially to said rated load.

Preferably, the process of the invention is also characterized in that, said vehicle having a vehicle trim height relative to the ground, said flexible joint is subjected to said deformation R during the final assembly of the vehicle and before adjustments linked to said vehicle trim height are carried out.

Preferably, the process of the invention is characterized in that said deformation R is achieved, after mounting said suspension device on the vehicle, by making said suspension device undergo a movement which extends as far as said maximum compression limit.

Preferably, this process is furthermore characterized in that, the vehicle being on the ground, said deformation R is obtained, after mounting said suspension device on the vehicle, by exerting an appropriate force on said body of said vehicle.

Alternatively, the process of the invention is characterized in that said deformation R is obtained, after mounting said device on the vehicle, by exerting a force on the wheels of said vehicle, the body of which is kept immobilized.

Alternatively, the process of the invention is characterized in that said flexible joint is subjected to said deformation R before the mounting of said suspension device on said vehicle.

Preferably, this process is furthermore characterized in that said flexible joint is subjected to said deformation R before said flexible joint is mounted within said suspension device.

The invention also consists of an elastomeric flexible joint intended to act as a spring for a vehicle suspension device, said joint bearing a substantial part of the load, said flexible joint being characterized in that it comprises means suitable for keeping it in a temporary state of preselected deformation, said preselected deformation being of the same type as a deformation caused by said load.

Preferably, the flexible joint of the invention is characterized in that it comprises cutouts in the elastomeric material and that wedging means are present in said cutouts.

Alternatively, the flexible joint of the invention is characterized in that, said flexible joint comprising rigid parts which are mobile relative to each other, said flexible joint is kept in said temporary state of preselected deformation by a clamping means temporarily linking said rigid parts.

Thus, the invention proposes subjecting the elastomeric spring, before the mounting thereof, during the mounting thereof and in any case before being put into normal service, that is to say, delivery of the vehicle to the end user, to comparable deformation, that is to say, deformation of the same type, of the same direction and of an intensity similar to the maximum deformation conceivable in service. In practice, the definition of the maximum deformation conceivable in service will depend on numerous parameters because, even in the case of a suspension device comprising mechanical displacement stops, the displacement limit cannot be located precisely because it is a function of the deformations (elastic or plastic) of the stops and of the rest of the structure. However, it is possible to agree on a maximum deformation corresponding, for example, to the deformation beyond which the rigid structure of the suspension device deforms plastically. It is also possible to agree that the maximum deformation is achieved when the wheel comes into contact with the wheel housing formed in the vehicle body if this eventuality is reasonable. This precise choice of the maximum reference deformation is arbitrary, but the deviations are limited in terms of deformation of the spring (for example, at most of the order of 10%). The principle of the invention is to subject the joint to a deformation such that its point of equilibrium around the static load is stabilized. This aim is achieved by the fact that the joint is subjected to deformation comparable to the maximum deformation envisaged in normal service. Preferably, in order to limit further the instability of the static point of equilibrium of the suspension, care will be taken to subject the joint to an equal or slightly greater deformation (for example of the order of the uncertainty on the maximum conceivable deformation).

Tests have shown that deformation for a very short time (of the order of one second) was sufficient to obtain the desired effect. It was also noted that the fact of maintaining this deformation for a longer time (several days, or even several weeks) did not have any adverse consequences.

The invention proposes various embodiments of this solution, the common principle being to subject the flexible joint to a deformation R comparable to the maximum deformation M envisaged in service on the suspension device and, preferably, then to relax said stress, in order to achieve a state of deformation S corresponding substantially to the rated load intended for the vehicle. The suspension devices (or the vehicles intended to be fitted therewith) generally comprise a stop limiting the movement of the suspension, that is to say that the conceivable maximum deformation M is substantially (see above) determined by the geometric characteristics of design of the vehicle and that it is made concrete on the vehicle.

A first possible embodiment of the invention consists, after mounting the axle on the vehicle, in stressing the suspension so as to bring it to the displacement limit, at the maximum compression permitted by the geometry (and, if applicable, the reasonable deformations of the structure or stops) and then, preferably, let the vehicle rest on its wheels, the elastomeric spring bearing the rated static load.

A second possible embodiment of the invention consists, after assembling the constituent parts of the suspension device but before mounting it on the vehicle, in appropriately stressing the axle to subject it to the deformation R, relaxing this stress to the level of deformation S (substantially corresponding to the take up of the rated static load), then locking the suspension arms relative to a chassis reference of the vehicle until this subassembly is mounted on the vehicle and preferably until it is placed under static load.

A third possible embodiment of the invention consists in imposing the deformation R on an elastomeric flexible joint before it is mounted within a suspension device, then keeping it deformed at the level of deformation S by a device for locking the joint until it is mounted and preferably until it is placed under rated load.

In fact, the process of the invention may be implemented at any stage of assembly of the vehicle before it is put into service. However, the numerous conceivable variants do not have the same advantages and the same constraints.

In the case of suspension joints having cutouts in the elastomeric material, as described in patent application EP 0 956 984, the cut-outs in the elastomeric material deforming under the stress, wedging means may be used as the means for locking the joint, the profiles of which wedging means correspond to those of the deformed cutouts. These wedging means are then placed in the cutouts before completely releasing the stress, then these wedging means are removed after mounting on the vehicle, preferably after it is placed under static load.

In the case of a suspension device also comprising a shock-absorber, it is possible to maintain the stress of the elastomeric spring by temporarily locking the movement of the suspension by means of mechanical or hydraulic limitation of the displacement of the shock-absorber.

It is also possible to adopt any other mechanical locking solution which angularly clamps the radially outer and inner rigid parts of the elastomeric spring relative to each other, then the parts are freed after the spring has been mounted on the suspension device, preferably on the vehicle after it is placed under static load.

Generally, it is preferred to lock the flexible joint at a level of deformation S which is substantially equal to the deformation corresponding to the rated load. But for various reasons, a substantially different level of deformation may be selected, for example a lower level of deformation (lower stress, hence potentially lower cost of the holding elements and less energy stored) or a greater level of deformation (better anticipation of later creep, less space taken up).

The solutions intended to stabilize the mechanical operating characteristics of a joint well before mounting (several days) on the vehicle have additional advantages: firstly, the creep of the first few days is integrated (see above), which makes it possible to effect final adjustment of the vehicle (adjustment of the headlight beams, of the brake power distributor, the front axle, etc.) in a configuration even closer to the later operating situation and secondly, this permits mounting (during a repair) of such a joint by a normally-equipped professional without occurrence of the phenomenon of variation in vehicle trim height described above.

BRIEF DESCRIPTION OF THE DRAWINGS

The principles of the invention and certain preferred embodiments of the invention are shown in the drawings in which.

DESCRIPTION OF PREFERRED EMBODIMENTS

Figure 1:
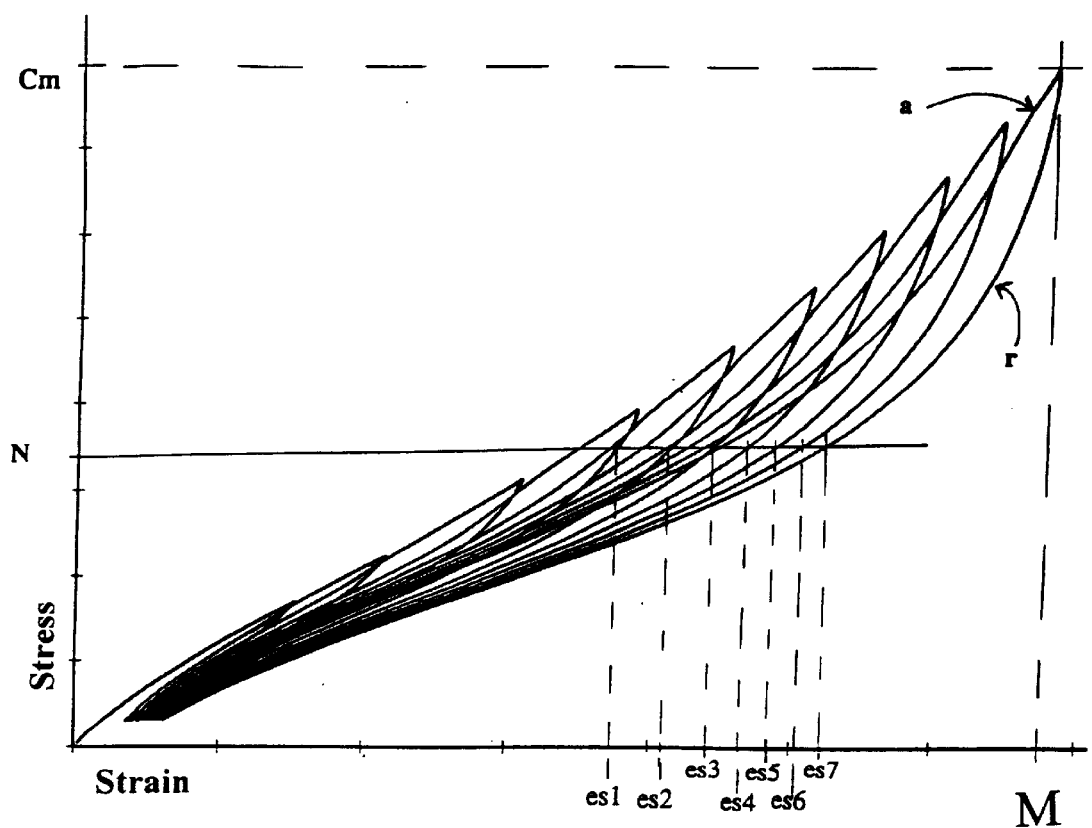
FIG. 1 is a graph showing the evolution of the stress in relation to the strain of an elastomeric joint during a series of deformation cycles.

The graph of FIG. 1 shows the evolution of the stress (for example, the torque transmitted by the wheel arm) as a function of the deformation (for example, vehicle trim height or angular position of the wheel arm) of a load-bearing elastomeric joint during a series of load cycles of increasing intensity. The phenomenon of hysteresis is readily apparent, this phenomenon meaning that, for each cycle, the "outward" curves a (corresponding to an increasing stress) are not superposed on the "return" curves r (corresponding to a decreasing stress), as would be the case for a metal spring commonly used in the field of suspensions. The fact that for an equal stress N the point of equilibrium (es1, es2, es3, es4, es5, es6, es7) varies from one cycle to the other until the maximum deformation M has been reached can equally well be visualized. Hence the changes noted in the vehicle trim height of a vehicle fitted with a suspension device comprising such an elastomeric flexible joint acting (among other things) as a spring.

Figure 2:
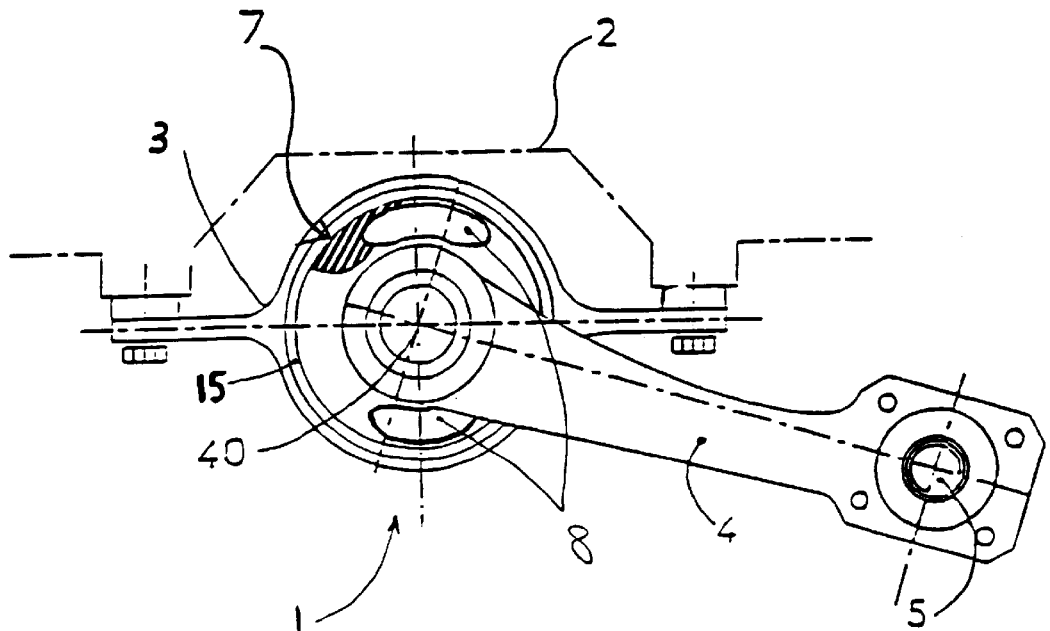
FIG. 2 is a view of a rear suspension device of a vehicle comprising an elastomeric flexible joint having (among others) the function of a spring in its deformed state corresponding to a rated load.
Figure 3:
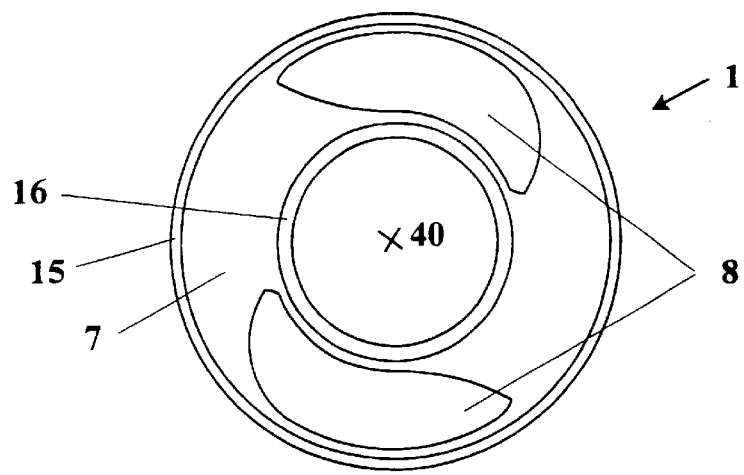
FIG. 3 is a view of an elastomeric flexible joint in its state free of any stress.

FIG. 2 shows an example of a rear suspension device for a vehicle, a more complete description of which can be found in International Application WO 97/47486. The joint 1 is fastened to the body 2 of a vehicle by means of a support 3 and holds a suspension arm 4 which bears a spindle 5 (the wheel borne by the spindle 5 is not shown). The joint 1 is formed of two rigid, cylindrical concentric parts 15, 16 (see FIG. 3), connected by a sleeve of elastomeric material 7. This assembly acts as a suspension spring upon movements of the arm 4 about its axis 40, the elastomeric sleeve 7 being under torsional stress. In FIG. 2, the suspension is bearing the static rated load N as opposed to the representation of FIG. 3 where the joint 1 is in its free state as it is, for example, at the end of the manufacturing process.

For example, the device of FIG. 2 can be designed to perform its function under a static deformation S in the order of 45° and a maximum deformation M in the order of 60°. That is to say that a torsion of about 45° is necessary for the joint to take up the rated load and that the suspension and vehicle characteristics are such that in case of maximum deflection, the torsion is in the order of 60°.

Figure 4:
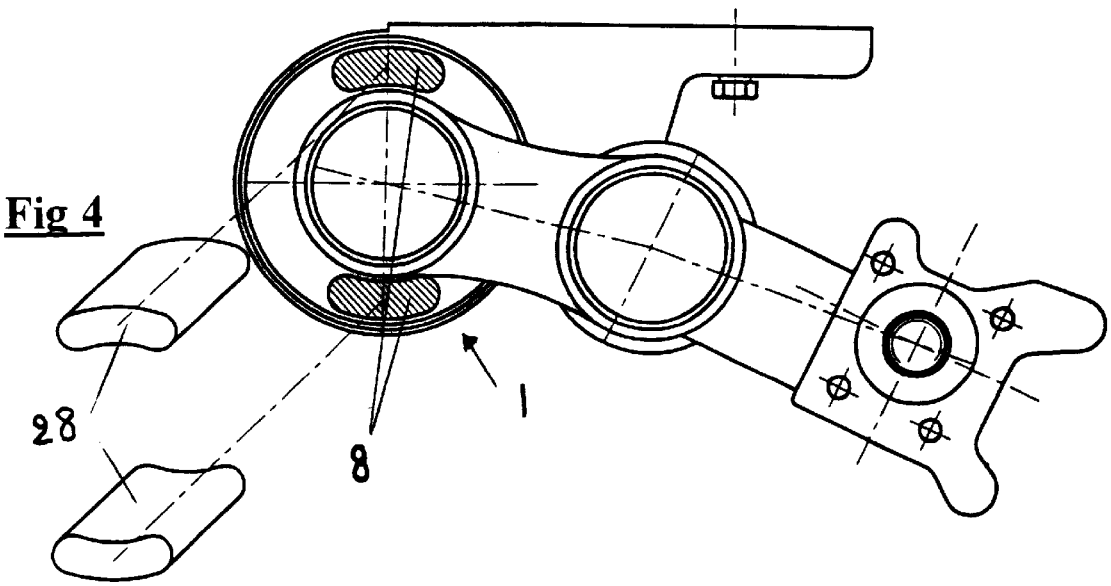
FIG. 4 is a diagram of an embodiment of the locking means for the joint.

In this example, the elastomeric material 7 comprises cutouts 8 in the form of recesses in order to have different stiffnesses as a function of the azimuth. When the process of the invention is implemented, a deformation is imposed on the joint. If the elastomeric material 7 comprises cutouts 8 as is the case here, the profile of these cutouts 8 varies as shown by the difference in profile between FIGS. 2 and 3. If, while the elastomeric material 7 is deformed (FIG. 2), wedging means of complementary profile are introduced into these cutouts 8, the inverse movement is prevented to a great extent. Thus, for example, it is possible to keep a joint in a substantially controlled position corresponding to, or close to, the position of static load during operation on the vehicle, such as that of FIG. 2. This possibility is illustrated in FIG. 4, which shows wedging means 28, the profile of which is complementary to that of the cutouts 8 in the elastomeric sleeve 7 in order to keep the load-bearing joint 1 in a configuration close to the rated static deformation S during operation on the vehicle.

Figure 5:
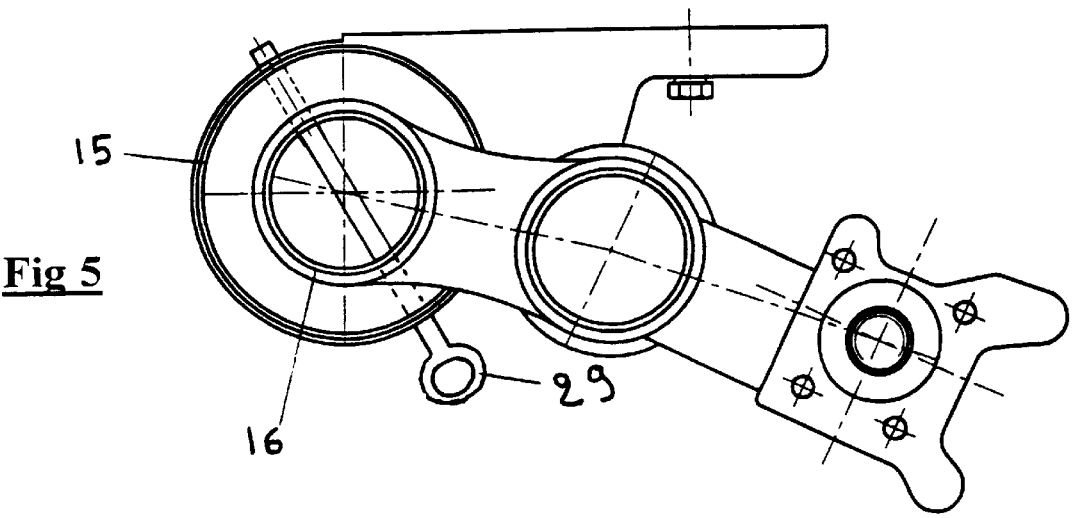
FIG. 5 is a diagram of a second example of embodiment of the locking means for the joint.

One alternative is shown in FIG. 5, where a pin 29 immobilizes the inner and outer parts of the joint in a configuration close to the rated static deformation S during operation on the vehicle. Thus, after mounting on the vehicle and application of the static load, the pin or pins 29 can readily be extracted from the joints. The pin is naturally a specific case of clamping but many other types of clamping means may be used.

Figure 6:
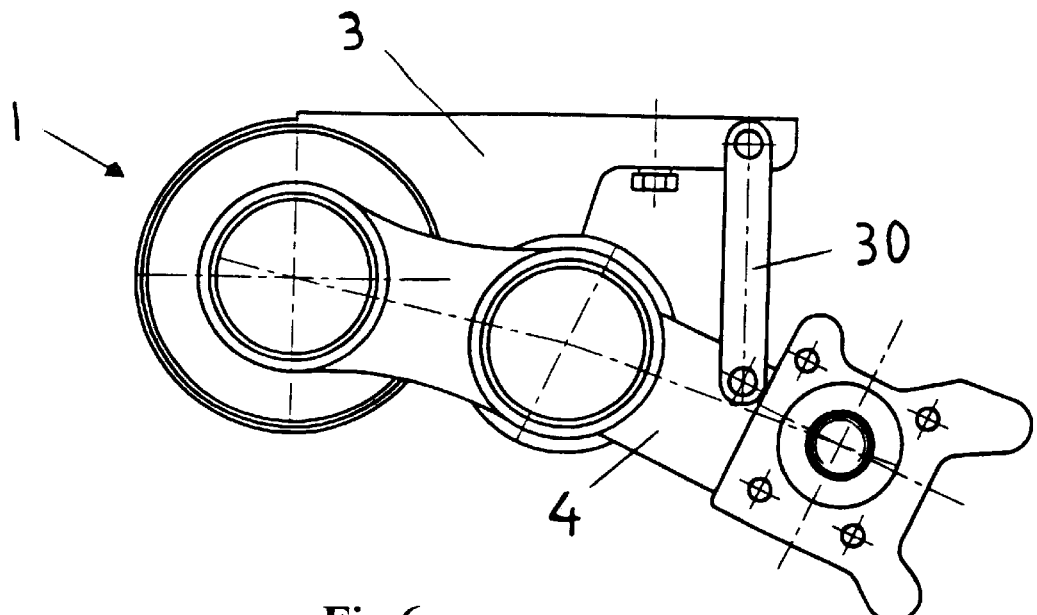
FIG. 6 is a diagram of a third example of an embodiment for locking a suspension device.

Another alternative is shown in FIG. 6, where a link 30 temporarily connects the rigid elements of the suspension device, namely the arm 4 and the support 3 intended for connection to the body of the vehicle. Thus, after assembling the suspension device and applying deformation comparable to the maximum deformation envisaged in service, the device is kept in its static load configuration and sent for mounting on the vehicle. Once mounted beneath the body and loaded, this temporary link 30 is removed from the suspension device. Here too, the link 30 is a specific case of clamping but many other types of clamping means may be used.

Figure 7:
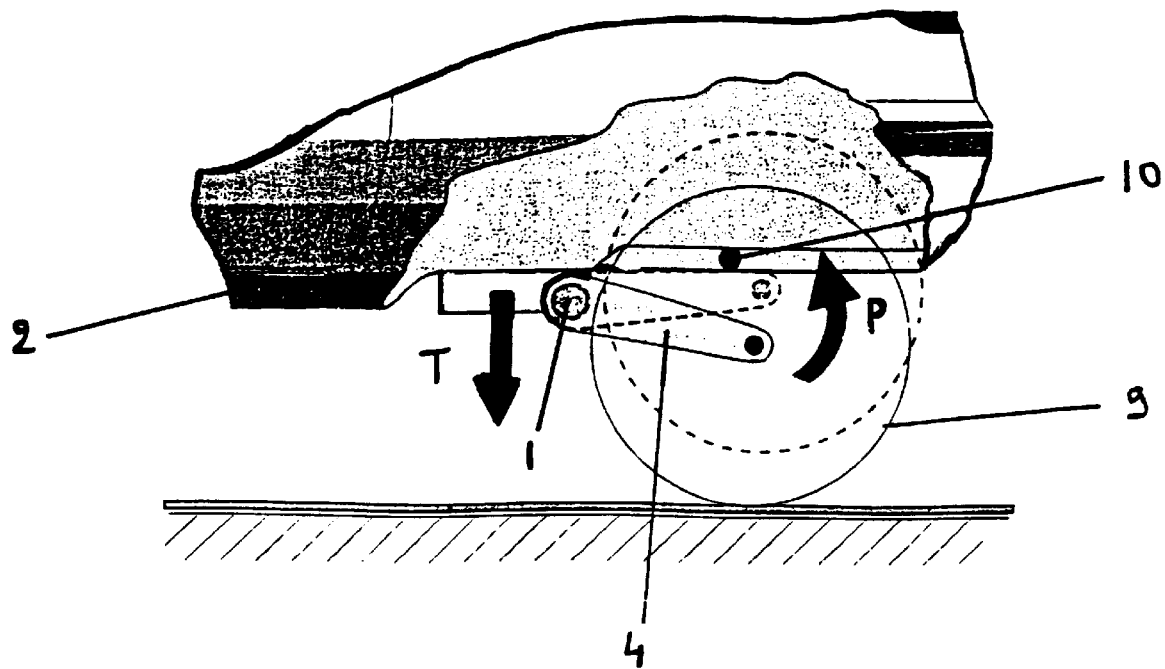
FIG. 7 is a partial view of a vehicle showing one possible embodiment of the process of the invention.

In FIG. 7 there is shown another way of implementing the process of the invention. In this case, the process is implemented after the assembly of the suspension device and mounting on the vehicle. Then a stress sufficient to make the suspension pass through its entire displacement is imposed thereon, that is to say until the maximum displacement limit indicated here by a stop 10 is reached. This may be accomplished in various ways. A vertical tensile force T oriented towards the ground may be exerted on the body 2, while the vehicle is immobilized, resting on the ground on its wheels 9. Alternatively, a vertical thrust P oriented upwards may be exerted on the wheels 9 or on the suspension arms 4, while the body 2 of the vehicle is kept immobilized by temporary clamping. The vehicle will then preferably be allowed to rest on its wheels, that is to say in a configuration close to the rated load. The vehicle trim height, at this moment, is stabilized at a level corresponding substantially to the level predetermined when designing the vehicle, and it is then possible to perform the final adjustments which depend on this vehicle trim height (for example, the orientation of the headlight beams or the brake power distributor, etc.).

Without departing from the spirit of the invention, the person skilled in the art may conceive of other possible ways of implementing the process of the invention, such as, for example, during a test, that of making the vehicle cross a road hump at a speed such that its suspension is stressed substantially over its entire displacement.

We claim:

1. A process for stabilizing mechanical operating characteristics of an elastomeric flexible joint intended for use as a spring in a suspension device for a vehicle, said vehicle having a body and wheels, said elastomeric flexible joint vein intended to take up a given rated load, said suspension device permitting movement as far as maximum compression limit, said process comprising, before putting the vehicle into normal service, subjecting said elastomeric flexible joint to a deformation R comparable to a maximum deformation M corresponding to the deformation undergone by said joint when said suspension reaches said maximum compression limit.

2. A process according to claim 1, characterized in that said deformation R is greater than or equal to said maximum deformation M.

3. A process according to claim 1, characterized in that said flexible joint is subjected to said deformation R, then said deformation R is relaxed until a deformation S is achieved which corresponds substantially to said rated load.

4. A process according to claim 1, characterized in that, said vehicle having a vehicle trim height relative to the ground, said flexible joint is subjected to said deformation R during the final assembly of the vehicle and before adjustments linked to said vehicle trim height are carried out.

5. A process according to claim 1, characterized in that said deformation R is achieved, after mounting said suspension device on the vehicle, by making said suspension device undergo a movement which extends as far as said maximum compression limit.

6. A process according to claim 1, characterized in that, the vehicle being on the ground, said deformation R is obtained, after mounting said suspension device on the vehicle, by exerting an appropriate force on said body of said vehicle.

7. A process according to claim 1, characterized in that said deformation R is obtained, after mounting said device on the vehicle, by exerting a force on the wheels of said vehicle, the body of which is kept immobilized.

8. A process according to claim 1, characterized in that said flexible joint is subjected to said deformation R before the mounting of said suspension device on said vehicle.

9. A process according to claim 1, characterized in that said flexible joint is subjected to said deformation R before said flexible joint is mounted within said suspension device.

10. A process according to claim 8, characterized in that said flexible joint is subjected to said deformation R and kept deformed by means of a locking device.

11. A process according to claim 9, characterized in that said flexible joint is subjected to said deformation R and kept deformed by means of a locking device.

12. A process according to claim 8, characterized in that said flexible joint is kept deformed by means of said locking device in a state of deformation S comparable to a state of deformation corresponding to said rated load.

13. A process according to claim 9, characterized in that said flexible joint is kept deformed by means of said locking device in a state of deformation S comparable to a state of deformation corresponding to said rated load.

14. A process according to claim 10, characterized in that said flexible joint is kept deformed by means of said locking device in a state of deformation S comparable to a state of deformation corresponding to said related load.

15. A process according to one of claims 10, 11, 12, 13 or 14, characterized in that in the case of an elastomeric flexible joint comprising a cutout in the elastomeric material, said locking device comprises a wedging means which is introduced into said cutout.

16. A process according to one of claims 10, 11, 12, 13, or 14, characterized in that, said joint being essentially formed of an elastomeric sleeve connecting rigid parts, said rigid parts having, in operation, a relative movement, said locking device comprises a clamping means which can be disconnected from said rigid parts.

17. A process according to one of claims 10, 11, 12, 13, or 14, characterized in that, said suspension device comprising rigid elements which are mobile relative to each other upon said movement, said locking device comprises a link connecting said rigid elements which can be disconnected from said rigid elements.

18. An elastomeric flexible joint for use as a spring for a suspension device for a vehicle, said elastomeric flexible joint bearing a substantial part of the load of the vehicle, said elastomeric flexible joint comprising a deformable elastomeric element intended to be subjected to a vehicle type of deformation caused by the load and means for keeping the deformable, elastomeric element in a temporary state of preselected deformation, said preselected deformation being of the same type as a deformation caused by said load, wherein said elastomeric flexible joint further comprises cutouts in the elastomeric material and wedging means inserted into said cutouts.

19. An elastomeric flexible joint for use as a spring for a suspension device for a vehicle, said elastomeric flexible joint bearing a substantial part of the load of the vehicle, said elastomeric flexible joint comprising a deformable elastomeric element intended to be subjected to a type of deformation caused by the load and means for keeping the deformable, elastomeric element in a temporary state of preselected deformation, said preselected deformation being of the same type as a deformation caused by said load, wherein said elastomeric flexible joint further comprises rigid parts which are mobile relative to each other and in which said elastomeric flexible joint is kept in said temporary state of preselected deformation by temporarily clamping said rigid parts.

* * * * *